(12) United States Patent
Lee

(10) Patent No.: US 6,944,445 B2
(45) Date of Patent: Sep. 13, 2005

(54) HOMEZONE CALL FORWARDING SERVICE METHOD

(75) Inventor: Hyun-Jung Lee, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 499 days.

(21) Appl. No.: 09/849,574

(22) Filed: May 4, 2001

(65) Prior Publication Data

US 2001/0051518 A1 Dec. 13, 2001

(30) Foreign Application Priority Data

Jun. 1, 2000 (KR) ........................................ 2000-29980

(51) Int. Cl.⁷ ............................ H04M 3/42; H04Q 7/20
(52) U.S. Cl. ..................... 455/417; 415/414; 415/413; 415/432; 415/433; 415/435; 415/445; 415/524; 415/458; 415/461; 415/408; 415/406
(58) Field of Search ................................. 455/414, 417, 455/432, 433, 435, 445, 524, 560, 413, 458, 461

(56) References Cited

U.S. PATENT DOCUMENTS

| | | | | |
|---|---|---|---|---|
| 5,673,308 A | * | 9/1997 | Akhavan .................... 455/461 |
| 5,867,784 A | * | 2/1999 | Lantto ...................... 455/432.2 |
| 5,901,359 A | * | 5/1999 | Malmstrom ................. 455/461 |
| 5,978,673 A | * | 11/1999 | Alperovich et al. ........ 455/417 |
| 6,070,080 A | * | 5/2000 | Madour et al. ............. 455/458 |
| 6,134,433 A | * | 10/2000 | Joong et al. ................ 455/417 |
| 6,138,007 A | * | 10/2000 | Bharatia .................. 455/414.1 |
| 6,282,416 B1 | * | 8/2001 | Verdonk ..................... 455/413 |
| 6,539,223 B1 | * | 3/2003 | Bijanki et al. ........... 455/456.3 |
| 6,671,506 B1 | * | 12/2003 | Lee ............................. 455/406 |
| 6,785,536 B1 | * | 8/2004 | Lee et al. .................... 455/408 |

* cited by examiner

*Primary Examiner*—Allan Hoosain
(74) *Attorney, Agent, or Firm*—Dilworth & Barrese LLP

(57) ABSTRACT

Disclosed is a method for performing a call forwarding service on a PSTN number as well as an MDN number in a homezone. By including additional parameters in the setup and transfer messages communicated between an originating mobile switching center (MSC), a home location register (HLR), and a terminating MSC, the method can perform the call forwarding service in a homezone. The additional parameters include number identification information and termination triggers that enable the homezone call forwarding service.

7 Claims, 2 Drawing Sheets

HOMEZONE CALL FORWARDING SERVICE METHOD

PRIORITY

This application claims priority to an application entitled "Homezone Call Forwarding Service Method" filed in the Korean Industrial Property Office on Jun.1, 2000 and assigned Serial No. 2000-29980, the contents of which are hereby incorporated by reference.

BACKGROUND OF THE INVENTION

1. Field of the Invention

The present invention relates generally to a homezone service method in a mobile communication system, and in particular, to a method for providing a call forwarding service on a PSTN (Public Switched Telephone Network) number as well as an MDN (Mobile Directory Number) number in a homezone.

2. Description of the Related Art

For a homezone service, a service provider allocates a specific zone, called a "homezone", to a mobile phone subscriber, and then applies different call rates to a call made in the homezone and a call made in a non-homezone.

For example, if a mobile subscriber has applied for the homezone service by designating his home as a homezone, the service provider will charge the subscriber a call rate equal to a wire call rate for the call made in the subscriber's home (i.e., homezone) using the mobile phone, but will charge the subscriber a normal call rate of the mobile phone for the call made out of the subscriber's home (i.e., non-homezone). To this end, the mobile phone is assigned two numbers: one is an NSN (National Significant Number) number based on the PSTN number system used for charging the call made in the homezone and another is an MDN number used for charging the call made in the non-homezone.

It is conventionally available to provide a call forwarding service on the MDN number. The conventional call forwarding service, however, is based on a common mobile communication system that does not provide the homezone service. Therefore, a call forwarding service on the NSN number allocated for the homezone service has not been fully considered heretofore.

FIG. 1 shows a conventional method for providing a call forwarding service on the MDN number. An originating MSC (Mobile Switching Center) provides a service to an originating subscriber. For a call originating using the PSTN or other networks, the originating MSC becomes a gateway MSC. A terminating (or serving) MSC provides a service to a terminating subscriber called by the originating subscriber. A home location register (HLR) stores subscriber information such as terminal information and additional service information. Herein, the HLR stores information about the terminating subscriber.

When the originating subscriber calls the terminating subscriber (e.g., the NSN number), the originating MSC sends a location request invoke message LOCREQ to the HLR of the terminating subscriber in order to acquire location information of the terminating subscriber. The location request invoke message LOCREQ includes dialed digits DGTSDIAL and a system ID parameter (not shown) for the originating MSC. Here, the originating subscriber refers to an originating subscriber who uses a normal PSTN phone or a mobile phone. The terminating subscriber refers to a mobile subscriber registered in the homezone service.

The HLR determines MDN termination by analyzing the received dialed digits DGTSDIAL and sends a routing information request invoke message ROUTREQ to the terminating MSC in order to acquire routing information. The routing information request invoke message ROUTREQ includes a mobile identification number (MIN).

Upon receipt of the routing information request invoke message ROUTREQ, the terminating MSC assigns a temporary local directory number (TLDN) for routing. In addition, the terminating MSC sends a routing information request result message routreq (RoutingRequest RETURN RESULT) to the HLR of the terminating subscriber. The routing information request result message routreq includes a routing information parameter TLDN.

Upon receipt of the routing information request result message routreq, the HLR of the terminating subscriber sends a location request result message locreq (LocationRequest RETURN RESULT) to the originating MSC. The originating MSC detects the TLDN number included in the location request result message locreq, routes the detected TLDN number to the terminating MSC, and performs a call setup process.

The terminating MSC sends a redirecting request invoke message redreq (RedirectingRequest) to the originating MSC for call forwarding, in such a termination-inactivated state as a busy state, a no-answer state and a no-page response state. At the moment, the terminating MSC includes a redirecting reason parameter REDREASON (RedirectingReason) in the redirecting request invoke message.

Upon receipt of the redirecting request invoke message redreq from the terminating MSC, the originating MSC sends a transfer number (or a call forwarding number) request invoke message TRANUMREQ (TransferToNumberRequest) to the HLR of the terminating subscriber in order to find out a call forwarding number (or a transfer number to which an incoming call is to be forwarded). The transfer number request invoke message TRANUMBREQ includes a redirecting reason parameter REDREASON.

The HLR of the terminating subscriber searches a call forwarding number of the terminating subscriber, inserts the searched call forwarding number in the transfer number (or a call forwarding number) request result message tranumreq (TransferToNumberRequest RETURN RESULT) and then transmits the transfer number request result message tranumreq to the originating MSC. The originating MSC then detects the call forwarding number from the transfer number request result message tranumreq and performs the termination process again. The redirection request ("REDREQ") is sent from the terminating MSC to the originating MSC.

However, in such a call forwarding service, the terminating MSC determines whether to transfer (or forward) an incoming call in the termination-inactivated state, based on a calling feature indicator parameter (CallingFeaturesIndicator) provided from the HLR to a VLR (Visitor Location Register). The calling feature indicator parameter CallingFeaturesIndicator, however, defines only a call forwarding feature field for the MDN number. Therefore, it is not possible to use the calling feature indicator parameter CallingFeaturesIndicator as call forwarding information for other numbers except the MDN number.

SUMMARY OF THE INVENTION

It is, therefore, an object of the present invention to provide a method for performing a call forwarding service on a NSN number as well as an MDN number in a homezone.

To achieve the above and other objects, there is provided a homezone call forwarding service method. An origination mobile switching center (MSC) sends a location request invoke message to a home location register (HLR) of a terminating subscriber in order to acquire location information of the terminating subscriber, when an originating subscriber calls the terminating subscriber. The HLR analyzes number information included in the received location request invoke message to determine whether the number is a number for a homezone or a number for a non-homezone, and sends routing information request invoke message to a terminating MSC in order to acquire routing information. The routing information request invoke message includes a parameter for inserting number identification information and a termination trigger parameter for defining a termination trigger point presently activated for the subscriber. Upon receipt of the routing information request invoke message, the terminating MSC assigns a temporary local directory number (TLDN) for routing, registers a parameter having the number identification information and the termination trigger parameter in a visitor location register (VLR), and sends routing information request result message having a routing information parameter to the HLR of the terminating subscriber. Upon receipt of the routing information request result message, the HLR of the terminating subscriber sends a location request result message to the originating MSC. The originating MSC detects a local directory number (LDN) included in the location request result message, routes the detected local directory number to the terminating MSC, and performs a call setup process. After call setup, the terminating MSC determines whether to redirect a present call, by consulting the termination trigger parameter and a calling feature directive parameter registered in the VLR in a termination-inactivated state. The terminating MSC sends a redirecting request invoke message to the originating MSC, when it is determined to redirect the present call. Upon receipt of the redirecting request invoke message from the terminating MSC, the originating MSC sends a transfer number request invoke message to the HLR of the terminating subscriber in order to find out a call forwarding number. The HLR of the terminating subscriber analyzes the transfer number request invoke message to determine to which phone number the present call should be redirected, searches a call forwarding number of the terminating subscriber for the call forwarding service, inserts the searched call forwarding number in the transfer number request result message, and then sends the transfer number request result message to the originating MSC.

According to further embodiments of the present invention, the originating MSC detects the call forwarding number from the transfer number request result message and restarts a termination process. Also, the parameter for inserting number identification information is a leg information parameter. In addition, the termination trigger parameter is a parameter for defining a termination trigger point presently activated for the subscriber. Further, the termination-inactivated state includes a busy state, a no-answer state and a no-page response state. Still yet, the redirecting request invoke message includes a redirecting reason parameter and a leg information parameter. And also, the transfer number request invoke message includes the received leg information parameter and termination trigger parameter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is implemented using a termination trigger parameter TERMTRIG and a leg information parameter LEGINFO. With regard to the termination trigger parameter TERMTRIG, a local call uses a termination trigger parameter TERMTRIG in a local termination parameter LocalTermination of the location request result message locreq (LocationRequest RETURN RESULT), and an inter-system call uses a termination trigger parameter TERMTRIG of the routing request invoke message ROUTREQ (RoutingRequest INVOKE), to thereby send call forwarding information to the serving VLR/MSC. In the existing call forwarding process, since the HLR has no information for determining to which number (MDN or NSN number) the incoming call is to be forwarded, the leg information parameter LEGINFO is used. The leg information parameter LEGINFO is a parameter on which an identifier (ID) assigned to a call leg is loaded by the HLR to identify the call leg. If the HLR provides the leg information parameter LEGINFO to the terminating VLR/MSC, the terminating VLR/MSC should transmit this parameter back to the HLR during the call forwarding. Therefore, it is possible to perform homezone call forwarding using the leg information parameter LEGINFO in the following process.

According to the IS-41D standard, the leg information parameter LEGINFO defines a specific leg of a multiple termination call, e.g., a flexible alerting (FA) call assigned by the HLR. That is, the leg information can be used as an ID for a specific call leg in the multiple termination call such as the flexible alerting (FA) call or mobile access hunting (MAH) call, or an ID for a call leg when the incoming call is forwarded to a voice mail system (VMS). In addition, the leg information parameter LEGINFO is comprised of a leg type part and a call leg identification part. The leg type part is defined as FA, MAH, VMS and HZDN (Homezone Direction Number), and can be used in a group call, such as the FA and MAH calls, or a VMS call in addition to the homezone originating call. The call leg identification part defines an ID for identifying the call leg in the group call such as the FA and MAH calls.

Figure 1:
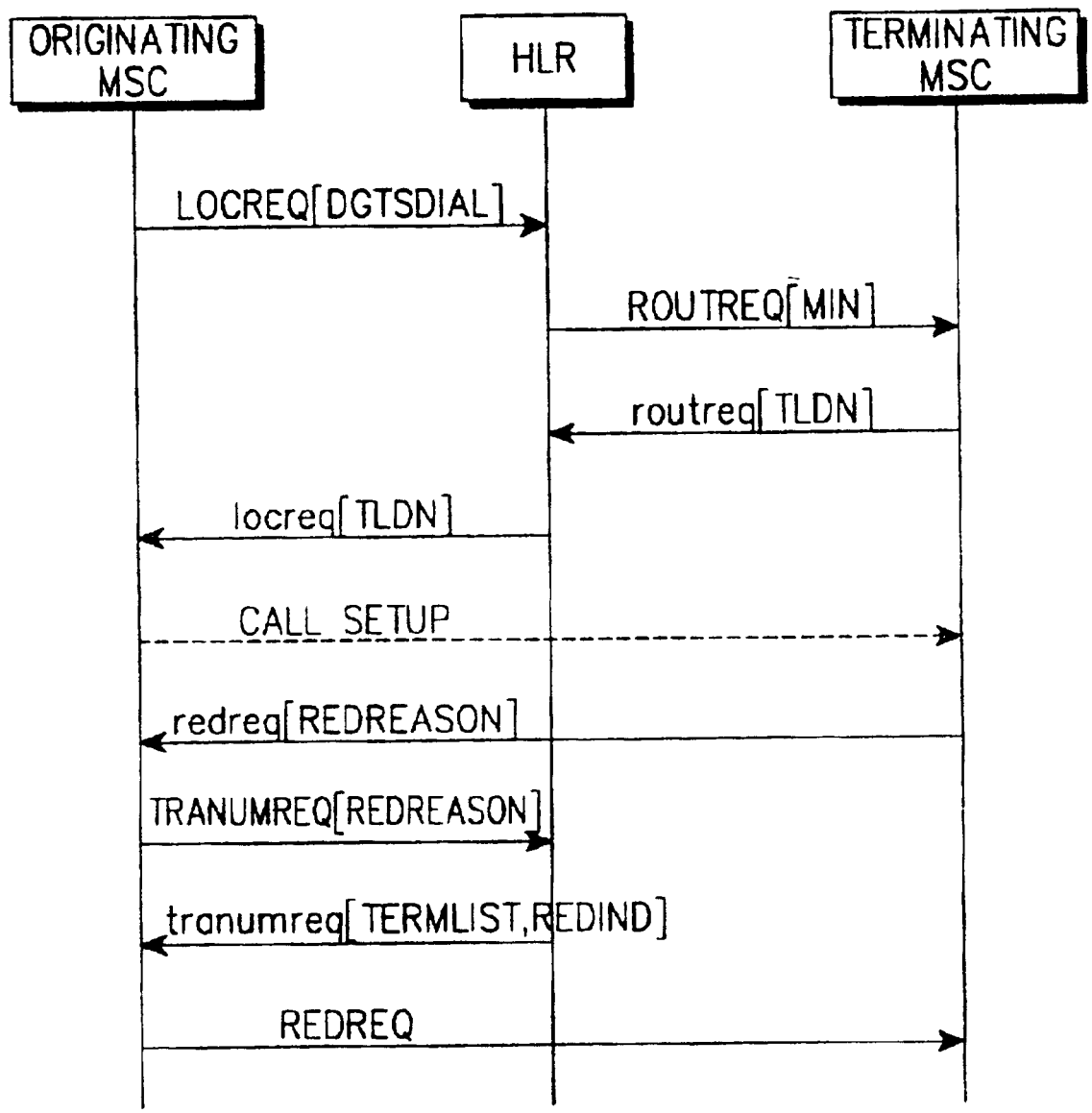
FIG. 1 is a flow diagram illustrating a conventional method for performing a call forwarding service on an MDN number.
Figure 2:
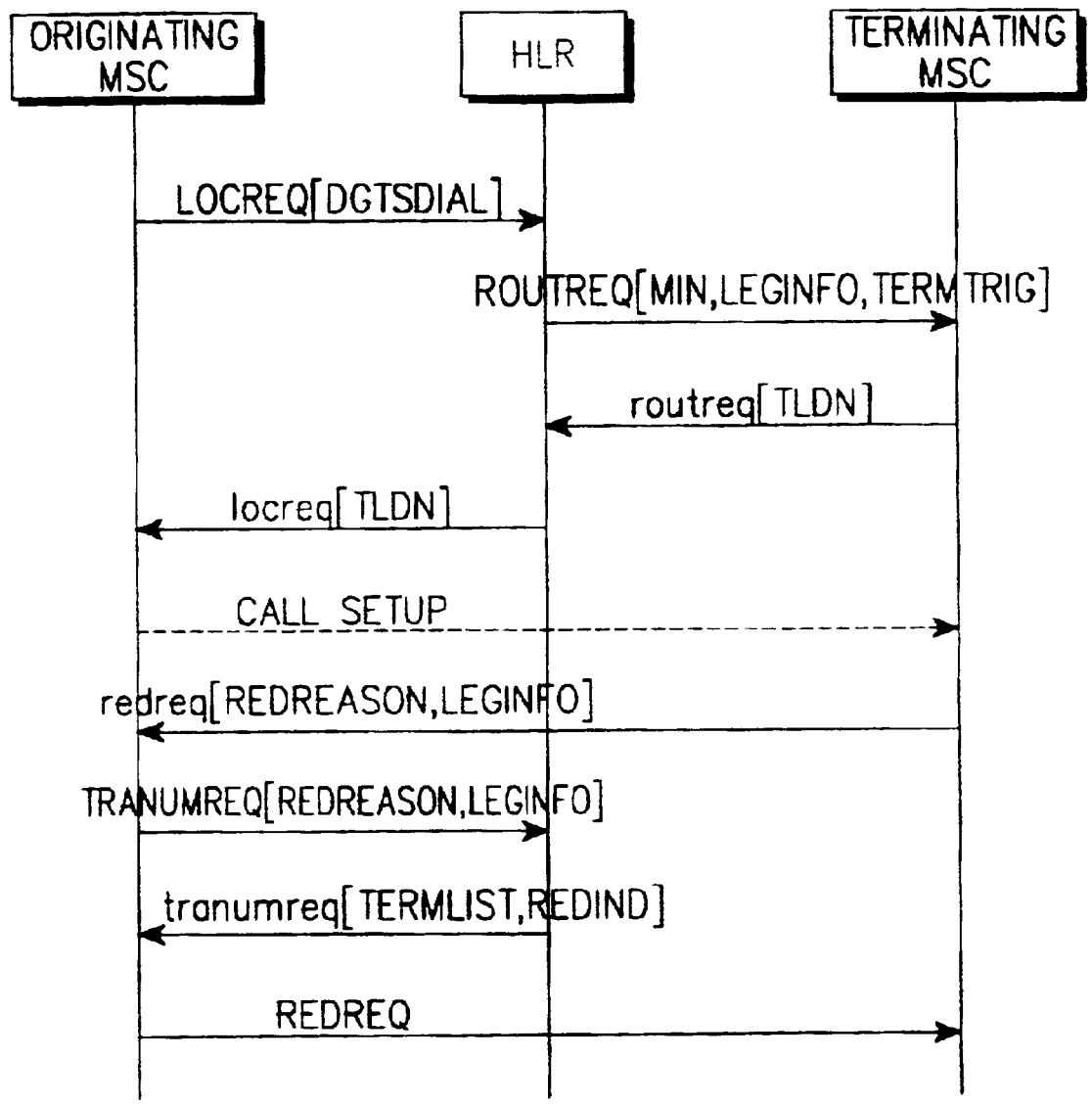
FIG. 2 is a flow diagram illustrating a homezone call forwarding service method according to an embodiment of the present invention.

FIG. 2 shows a homezone call forwarding service method according to an embodiment of the present invention.

When the originating subscriber calls the terminating subscriber (e.g., the NSN number in this embodiment), the originating MSC sends a location request invoke message LOCREQ to the HLR of the terminating subscriber in order to acquire location information of the terminating subscriber. The location request invoke message LOCREQ includes dialed digits DGTSDIAL and a system ID parameter (not shown) for the originating MSC. Here, the originating subscriber refers to an originating subscriber who uses a normal PSTN phone or a mobile phone. The terminating subscriber refers to a mobile subscriber registered in the homezone service.

The HLR determines whether call termination is NSN termination or MDN termination, by analyzing the received dialed digits DGTSDIAL, and sends a routing information request invoke message ROUTREQ to the terminating MSC in order to acquire routing information. The routing information request invoke message ROUTREQ includes a mobile identification number (MIN), a leg information parameter LEGINFO and a termination trigger parameter TERMTRIG. The leg information parameter LEGINFO is used to insert NSN identification information when the number included in the location request invoke message LOCREQ, i.e., the dialed digits DGTSDIAL are analyzed as an NSN number. The termination trigger parameter TERMTRIG is a parameter for defining a termination trigger point presently activated for the subscriber, and is information transmitted to the terminating MSC, in the call processing procedure, through the location request result message locreq (LocationRequest RETURN RESULT) or the routing information request invoke message ROUTREQ. For detailed information about the above parameters, see "IS-41D Book II, section 6.5.2.159". In the embodiment of the present invention, it is possible to send call forwarding service information not only for the MDN number but also for the NSN number to the VLR without modification of the existing IS-41D standard, by using the termination trigger parameter TERMTRIG.

Upon receipt of the routing information request invoke message ROUTREQ, the terminating MSC assigns a temporary local directory number (TLDN) for routing, and stores the received leg information parameter LEGINFO and termination trigger parameter TERMTRIG in the VLR (Visitor Location Register; not shown). The VLR is a register associated with the MSC on a one-to-one basis, and temporarily registers the subscriber information of the mobile terminal.

In addition, the terminating MSC sends a routing information request result message routreq (RoutingRequest RETURN RESULT) to the HLR of the terminating subscriber. The routing information request result message routreq includes a routing information parameter TLDN.

Upon receipt of the routing information request result message routreq, the HLR of the terminating subscriber sends a location request result message locreq (LocationRequest RETURN RESULT) to the originating MSC. The originating MSC detects the TLDN number included in the location request result message locreq, routes the detected TLDN number to the terminating MSC, and performs a call setup process.

The terminating MSC determines whether to redirect the present call by consulting the termination trigger parameter TERMTRIG and a calling feature indication parameter (CallingFeaturesIndicator), stored in a database of the VLR, in such a termination-inactivated state as a busy state, a no-answer state and a no-page response state. At the moment, if the subscriber is in a busy state and a busy field of the termination trigger parameter TERMTRIG is activated, the terminating MSC performs call redirecting (or call forwarding).

If the termination trigger parameter TERMTRIG or the calling feature indicator parameter CallingFeaturesIndicator is activated in the termination-inactivated state, the terminating MSC sends a redirecting request invoke message redreq (RedirectingRequest) to the originating MSC for call forwarding. Here, the terminating MSC includes a redirecting reason parameter READSON (RedirectingReason) and a leg information parameter LEGINFO in the redirecting request invoke message.

The calling feature indication parameter CallingFeaturesIndicator is a parameter for defining the subscriber's additional function qualification and activated state, and is transmitted from the HLR to the VLR through a location registration result message regreq (RegistrationNotification RETURN RESULT), a qualification information request message qualreq (QualificationRequest RETURN RESULT), or a qualification information directive invoke message QUALDIR (QualficationDirective INVOKE). The VLR stores the received information in its database. For detailed information about the above parameters, see "IS-41D Book II, section 6.5.2.20".

Upon receipt of the redirecting request invoke message redreq from the terminating MSC, the originating MSC sends a transfer number (or a call forwarding number) request invoke message TRANUMREQ (TransferToNumberRequest) to the HLR of the terminating subscriber in order to find out a call forwarding number (or a transfer number to which an incoming call is to be forwarded). The transfer number request invoke message TRANUMREQ includes the received leg information parameter LEGINFO and termination trigger parameter TERMTRIG, which serves to induce generation of the TRANUMREQ operation when it is determined that a call transfer is required.

If the leg information parameter LEGINFO is included in the transfer number request invoke message TRANUMREQ, the HLR of the terminating subscriber determines the call forwarding type by analyzing the leg information. Since the embodiment is applied to the NSN call forwarding (i.e., a call forwarding service on the NSN number), the HLR searches a call forwarding number of the terminating subscriber for the NSN call forwarding service, inserts the searched call forwarding number in the transfer number request result message tranumreq (TransferToNumberRequest RETURN RESULT) and then transmits the transfer number request result message tranumreq to the originating MSC. The originating MSC then detects the call forwarding number from the transfer number request result message tranumreq and performs the termination process again.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A homezone call forwarding service method comprising the steps of:

(1) sending, by an origination mobile switching center (MSC), a location request invoke message to a home location register (HLR) of a terminating subscriber in order to acquire location information of the terminating subscriber, when an originating subscriber calls the terminating subscriber;

(2) analyzing, by the HLR, number information included in the received location request invoke message to determine whether the number is a number for a homezone or a number for a non-homezone, and sending a routing information request invoke message to a terminating MSC in order to acquire routing information, said routing information request invoke message including a parameter for inserting number identification information and a termination trigger parameter for defining a termination trigger point presently activated for the subscriber;

(3) upon receipt of the routing information request invoke message, assigning, by the terminating MSC, a temporary local directory number (TLDN) for routing, registering a parameter having the number identification information and the termination trigger parameter in a visitor location register (VLR), and sending a routing information request result message having a routing information parameter to the HLR of the terminating subscriber;

(4) upon receipt of the routing information request result message, sending a location request result message to the originating MSC by the HLR of the terminating subscriber;

(5) detecting, by the originating MSC, a local directory number (LDN) included in the location request result message, routing the detected local directory number to the terminating MSC, and performing a call setup process;

(6) after call setup, determining by the terminating MSC whether to redirect a present call, by consulting the termination trigger parameter and a calling feature directive parameter registered in the VLR in a termination-inactivated state;

(7) sending, by the terminating MSC, a redirecting request invoke message to the originating MSC, when it is determined to redirect the present call, said redirecting request invoke message including the parameter for inserting number identification information;

(8) upon receipt of the redirecting request invoke message from the terminating MSC, sending, by the originating MSC, a transfer number request invoke message to the HLR of the terminating subscriber in order to determine a call forwarding number, said transfer number request invoke message including the parameter for inserting number identification information; and (9) analyzing, by the HLR of the terminating subscriber, the transfer number request invoke message to select a homezone or non-homezone call forwarding phone number to which the present call should be redirected, searching for a call forwarding number of the terminating subscriber for a call forwarding service, inserting the searched call forwarding number in the transfer number request result message, and then sending the transfer number request result message to the originating MSC.

2. The homezone call forwarding service method as claimed in claim 1, wherein, the originating MSC detects the call forwarding number from the transfer number request result message and restarts a termination process.

3. The homezone call forwarding service method as claimed in claim 1, wherein, the termination trigger parameter is a parameter for defining a termination trigger point presently activated for the terminating subscriber.

4. The homezone call forwarding service method as claimed in claim 1, wherein the termination-inactivated state is one of a busy state, a no-answer state and a no-page response state.

5. The homezone call forwarding service method as claimed in claim 1, wherein, the parameter for inserting number identification information is a leg information parameter.

6. The homezone call forwarding service method as claimed in claim 5, wherein the redirecting request invoke message includes a redirecting reason parameter and a leg information parameter.

7. The homezone call forwarding service method as claimed in claim 5, wherein the transfer number request invoke message includes the leg information parameter and the termination trigger parameter.

\* \* \* \* \*